(12) United States Patent
Naito et al.

(10) Patent No.: US 8,847,437 B2
(45) Date of Patent: Sep. 30, 2014

(54) SOLID ELECTROLYTIC CAPACITOR ELEMENT, METHOD FOR MANUFACTURING SAME, AND JIG FOR MANUFACTURING SAME

(75) Inventors: Kazumi Naito, Tokyo (JP); Masahiro Suzuki, Tokyo (JP)

(73) Assignee: Showa Denko K.K., Tokyo (JP)

( * ) Notice: Subject to any disclaimer, the term of this patent is extended or adjusted under 35 U.S.C. 154(b) by 496 days.

(21) Appl. No.: 13/257,153

(22) PCT Filed: Mar. 16, 2010

(86) PCT No.: PCT/JP2010/054387
§ 371 (c)(1),
(2), (4) Date: Sep. 16, 2011

(87) PCT Pub. No.: WO2010/107011
PCT Pub. Date: Sep. 23, 2010

(65) Prior Publication Data
US 2012/0014036 A1    Jan. 19, 2012

(30) Foreign Application Priority Data

Mar. 17, 2009    (JP) .................................. 2009-063829

(51) Int. Cl.
*H02M 3/06*    (2006.01)

(52) U.S. Cl.
USPC ......................................................... 307/109

(58) Field of Classification Search
USPC ......................................................... 307/109
See application file for complete search history.

(56) References Cited

U.S. PATENT DOCUMENTS

| | | |
|---|---|---|
| 2007/0002526 A1 | 1/2007 | Naito |
| 2009/0052118 A1 | 2/2009 | Naito |
| 2009/0090997 A1 | 4/2009 | Naito et al. |
| 2013/0182375 A1* | 7/2013 | Naito et al. ................... 361/528 |

FOREIGN PATENT DOCUMENTS

| | | |
|---|---|---|
| JP | 59-152733 U | 10/1984 |
| JP | 02-122512 A | 5/1990 |
| JP | 05-021286 A | 1/1993 |
| JP | 5-159981 A | 6/1993 |
| JP | 05-234825 A | 9/1993 |
| JP | 05-251282 A | 9/1993 |
| JP | 08-195331 A | 7/1996 |
| JP | 10-261551 A | 9/1998 |
| JP | 2001-102256 A | 4/2001 |
| JP | 2004-363491 A | 12/2004 |
| JP | 2005-123605 A | 5/2005 |
| JP | 2005-244154 A | 9/2005 |
| JP | 2007-324151 A | 12/2007 |
| WO | 2005/006360 A2 | 1/2005 |
| WO | 2006/101167 A1 | 9/2006 |
| WO | 2007/004555 A1 | 1/2007 |

* cited by examiner

*Primary Examiner* — Robert L. Deberadinis
(74) *Attorney, Agent, or Firm* — Sughrue Mion, PLLC (57) ABSTRACT

Provided is a jig for manufacturing electrolytic capacitor elements wherein the jig is for forming dielectric layers on the surfaces of anode bodies by anodic oxidation or for forming semiconductor layers on the dielectric layers formed on the surfaces of the anode bodies. The jig for manufacturing the electrolytic capacitor elements comprises (i) a plurality of power supply circuits which are provided on an insulating substrate and to each of which a voltage-limiting value and a current-limiting value can be set, (ii) connection terminals for the anode bodies which are electrically connected to the respective outputs of the power supply circuits, and (iii) a terminal for setting the voltage-limiting values to the power supply circuits and a terminal for setting the current-limiting values to the power supply circuits; in the jig, a proper current can be set corresponding to the progress of the anodic oxidation and electrolytic polymerization. A method for manufacturing the electrolytic capacitor elements using the jig.

22 Claims, 2 Drawing Sheets

SOLID ELECTROLYTIC CAPACITOR ELEMENT, METHOD FOR MANUFACTURING SAME, AND JIG FOR MANUFACTURING SAME

CROSS REFERENCE TO RELATED APPLICATION

This application is a National Stage of International Application No. PCT/JP2010/054387 filed Mar. 16, 2010, claiming priority based on Japanese Patent Application No. 2009-063829, filed Mar. 17, 2009, the contents of all of which are incorporated herein by reference in their entirety.

TECHNICAL FIELD

The present invention relates to a method of manufacturing an electrolytic capacitor element capable of attaining a stable capacitance appearance ratio, a jig for manufacturing the electrolytic capacitor element, and an electrolytic capacitor element manufactured by using the manufacturing method or the jig.

BACKGROUND ART

A solid electrolytic capacitor is constituted by an electrical conductor (anode body) as one electrode, a dielectric layer formed on the surface layer of the electrode, and the other electrode (semiconductor layer) provided thereon. In the manufacture of a polymer solid electrolytic capacitor, forming of the dielectric layer on the anode body by chemical conversion and forming of the semiconductor layer thereon by electropolymerization are sequentially performed. Generally, a plurality of anode bodies are electrically connected in parallel, and such treatment as anodic oxidation and electropolymerization is carried out on the anode bodies at one time.

In the case of forming a semiconductor layer on a plurality of anode bodies, the following problem occurs because respective anode bodies are not always homogeneous and also the semiconductor formation rate can be vary among the anode bodies. That is, the value of current flowing through each of the anode bodies cannot be constant, and in an extreme case, one anode body becomes defective (short-circuited state), and the current concentrates on the one anode body while almost no current flows through the other anode bodies. In light of the above, the inventors of the present invention have proposed the method of forming a semiconductor layer by subjecting chemically-converted anode bodies to constant current electropolymerization by means of circuits including constant current sources (Patent Document 1; JP 2005-244154 A (WO2005/006360 A2)).

CITATION LIST

Patent Document

[Patent Document 1] JP 2005-244154 A

SUMMARY OF INVENTION

Technical Problem

Generally, in the forming of a dielectric body by subjecting an anode body to anodic oxidation, the treatment is completed in a shorter period of time when the anodic oxidation is started at a higher current density. An excessively high current density, on the other hand, is responsible for more defects in the dielectric layer. Accordingly, an upper limit and a lower limit of the current density are determined within an allowable range for the treatment time and the defects.

As described above, even in the same type of anode body, the individual anode bodies are not always homogeneous and have a certain degree of deviation in characteristics regarding the anodic oxidation. Therefore, even in the case where the plurality of anode bodies are electrically connected in parallel and the anodic oxidation is carried out at one time by using the circuits including the constant current sources, a uniform current does not necessarily flow through the individual anode bodies. In light of this, in order to prevent the current density of an anode body through which the largest amount of current flows from exceeding the above-mentioned upper limit, it is necessary to suppress a total amount of current to be supplied to the plurality of anode bodies.

The chemical conversion treatment time, on the other hand, is determined based on an anode body in which the amount of current is small and the progress of anodic oxidation is slow. Therefore, suppressing the total amount of current to be supplied to the plurality of anode bodies as described above lengthens the treatment time more and more.

In the anodic oxidation and the electropolymerization, optimum current amounts are different depending on the progression stages of the respective treatments. In the chemical conversion treatment (anodic oxidation), a high current flows initially and almost no current flows at the final stage. In the electropolymerization (semiconductor layer formation), on the other hand, if a high current is used, pores are liable to be closed at the early stage of polymerization to make it difficult to obtain a high capacitance appearance ratio, and if a low current is used, a low resistance semiconductor layer is difficult to obtain and the equivalent series resistance (ESR) is increased.

Solution to Problem

As a result of the earnest study to solve the above-mentioned problems, the inventors of the present invention have completed the present invention by confirming that a group of low ESR capacitor elements having a narrow capacitance distribution can be obtained by carrying out anodic oxidation by limiting a current with respect to individual anode bodies, preferably by using a jig for manufacturing electrolytic capacitor elements including power supply circuits which are capable of setting voltage and current limit values with respect to individual anode bodies so as to change to a current amount appropriately in accordance with the progress of anodic oxidation or electropolymerization.

That is, the present invention provides a method of manufacturing a capacitor element, a capacitor element, and a jig for manufacturing a capacitor element described below.

[1] A method of manufacturing an electrolytic capacitor element, including the steps of: forming a dielectric layer on surfaces of a plurality of anode bodies by anodic oxidation at one time; and forming a semiconductor layer on the dielectric layer, in which the anodic oxidation is carried out by limiting a current for the anodic oxidation with respect to the individual anode bodies.

[2] The method of manufacturing an electrolytic capacitor element according to 1 above, in which a limit value of the current is reduced during the forming of the dielectric layer.

[3] The method of manufacturing an electrolytic capacitor element according to 1 or 2 above, in which the anodic oxidation to be carried out by limiting the current for the anodic oxidation with respect to the individual anode bodies is carried out by using a jig for manufacturing an electrolytic capacitor element, the jig including: (i) a plurality of power supply circuits provided on an insulating substrate, which are capable of setting each of a voltage limit value and a current limit value; (ii) connection terminals for the plurality of anode bodies, which are electrically connected to respective outputs of the plurality of power supply circuits; and (iii) a terminal for setting the voltage limit value and a terminal for setting the current limit value with respect to the plurality of power supply circuits.

[4] The method of manufacturing an electrolytic capacitor element according to 1 or 3 above, in which: the forming of the semiconductor layer is formed by electropolymerization; and the electropolymerization is carried out by limiting a current with respect to the individual anode bodies on which the dielectric layer is formed.

[5] The method of manufacturing an electrolytic capacitor element according to 4 above, in which the electropolymerization is carried out by a method involving energizing the anode bodies.

[6] The method of manufacturing an electrolytic capacitor element according to 4 or 5 above, in which a limit value of the current for the electropolymerization is increased during the electropolymerization.

[7] The method of manufacturing an electrolytic capacitor element according to any one of 4 to 6 above, in which: the electropolymerization to be carried out by limiting the current with respect to the individual anode bodies on which the dielectric layer is formed is carried out by using a jig for manufacturing an electrolytic capacitor element, the jig including: (i) a plurality of power supply circuits, which are capable of setting each of a voltage limit value and a current limit value on an insulating substrate; (ii) connection terminals for the plurality of anode bodies, which are electrically connected to respective outputs of the plurality of power supply circuits; and (iii) a terminal for setting the voltage limit value and a terminal for setting the current limit value with respect to the plurality of power supply circuits; and under a state in which output currents of all the plurality of power supply circuits are limited, when an average value of the output currents of the plurality of power supply circuits is 20 to 200 $\mu A$, the output currents of the individual power supply circuits are set within a range of from 90 to 110% of the average value.

[8] The method of manufacturing an electrolytic capacitor element according to 3 or 7 above, in which the anodic oxidation and the electropolymerization are carried out by using the same jig.

[9] The method of manufacturing an electrolytic capacitor element according to any one of 1 to 8, in which a number of the plurality of anode bodies is equal to or larger than 300.

[10] A method of manufacturing an electrolytic capacitor, including: manufacturing an electrolytic capacitor element by the method described in anyone of 1 to 9 above; electrically connecting an anode body of one or a plurality of the electrolytic capacitor elements to an anode terminal and electrically connecting a semiconductor layer to a cathode terminal; and jacketing the capacitor elements with a resin thereafter.

[11] An electrolytic capacitor element group, comprising 300 or more electrolytic capacitor elements which are obtained by the method according to 7 above and in which the dielectric layer is formed at one time, wherein the individual electrolytic capacitor elements each have a capacitance within a range from 90 to 110% of an average value of capacitances of the plurality of electrolytic capacitor elements.

[12] An electrolytic capacitor group, comprising electrolytic capacitors each including one or a plurality of capacitor elements of the electrolytic capacitor element group according to 11 above.

[13] A jig for manufacturing an electrolytic capacitor element, for forming a dielectric layer on a surface of an anode body by anodic oxidation, the jig including: (i) a plurality of power supply circuits provided on an insulating substrate, which are capable of setting a voltage limit value and/or a current limit value for forming a semiconductor layer on the dielectric layer formed on the surface of the anode body; (ii) connection terminals for the anode body, which are electrically connected to respective outputs of the plurality of power supply circuits; and (iii) a terminal for setting the voltage limit value and a terminal for setting the current limit value with respect to the plurality of power supply circuits.

[14] The jig for manufacturing an electrolytic capacitor element according to 13 above, for forming the dielectric layer on the surface of the anode body by the anodic oxidation, in which, under a state in which output currents of all the plurality of power supply circuits are limited, when an average value of the output currents of the plurality of power supply circuits is 0.4 to 2 mA, the output currents of the individual power supply circuits fall within a range of from 90% at minimum to 110% at maximum of the average value.

[15] The jig for manufacturing an electrolytic capacitor element according to 13 above, for forming the semiconductor layer on the dielectric layer formed on the surface of the anode body, in which, under a state in which output currents of all the plurality of power supply circuits are limited, when an average value of the output currents of the plurality of power supply circuits is 20 to 200 $\mu A$, the output currents of the individual power supply circuits fall within a range of from 90% at minimum to 110% at maximum of the average value.

[16] The jig for manufacturing an electrolytic capacitor element according to any one of 13 to 15 above, which are capable of changing the voltage limit value or the current limit value during the forming of the dielectric layer or the forming of the semiconductor layer.

[17] The jig for manufacturing an electrolytic capacitor element according to 16 above, in which the power supply circuits are capable of changing continuously the current limit value by a voltage applied to the terminal for setting the current limit value.

[18] The jig for manufacturing an electrolytic capacitor element according to any one of 13 to 17 above, in which a number of the plurality of power supply circuits is 10 to 330.

[19] The jig for manufacturing an electrolytic capacitor element according to any one of 13 to 18 above, in which: each of the power supply circuits has heating parts; the heating parts are disposed on both front and back side of the insulating substrate; and the same type of the heating part as the heating part disposed on the front side of the insulating substrate is disposed on a back side thereof corresponding to a position of the heating part disposed on the front side thereof.

[20] The jig for manufacturing an electrolytic capacitor element according to 19 above, in which the heating parts are each a transistor or a resistor.

[21] The jig for manufacturing an electrolytic capacitor element according to 19 or 20 above, in which the power supply circuits are each constituted by a discrete circuit.

[22] The jig for manufacturing an electrolytic capacitor element according to any one of 13 to 20 above, in which each of the power supply circuits is a circuit including a PNP transistor, in which an emitter of the transistor is electrically connected to a terminal for setting a maximum current value via a resistor, a base of the PNP transistor is electrically connected to a terminal for setting a maximum voltage value, and a collector of the transistor serves as an output.

Advantageous Effects of Invention

The present invention enables shortening a time required for forming the dielectric layer (chemical conversion treatment), which requires time in the capacitor manufacturing steps and selecting an optimum current amount according to the stage of chemical conversion treatment or electropolymerization. Therefore, a low ESR capacitor element group having a narrow capacitance distribution can be obtained.

MODE FOR CARRYING OUT THE INVENTION

A detailed description is given below on a method of manufacturing a capacitor element and a jig for manufacturing a capacitor element according to the present invention, in which method a dielectric layer is formed on the surfaces of a plurality of anode bodies by anodic oxidation at one time, and then a semiconductor layer is formed on the dielectric layer.

[Anode Body]

Examples of the anode body (electrical conductor) used herein include metal, an inorganic semiconductor, an organic semiconductor, carbon, a mixture of at least one kind thereof, and a laminate obtained by laminating an electrical conductor on the surface layer thereof. Among these anode bodies, a valve metal or a conductive oxide of a valve metal is preferred because a dielectric layer can be formed by subjecting the anode body itself to anodic oxidation, and further an anode body having pores is preferred because a dielectric layer having a large surface area can be obtained. Examples of such anode bodies include a sintered body of tantalum, niobium, niobium monoxide and titanium. Further, the anode body is preferred to have lead wires for connection to a jig for manufacturing a capacitor to be described later.

[Forming of Dielectric Layer]

In the present invention, anodic oxidation is carried out by limiting a current for anodic oxidation with respect to each of the plurality of anode bodies, to thereby form a dielectric layer on the surfaces of the anode bodies. With this, the anodic oxidation of the respective anode bodies can be progressed more uniformly as compared to the case of Patent Document 1 in which a plurality of anode bodies are electrically connected in parallel and anodic oxidation is carried out at one time. Accordingly, current concentration on a specific anode body can be avoided so that the current density can be increased, and in contrast, a delay of anodic oxidation can also be prevented, which occurs when a current hardly flows through a specific anode body, to thereby complete the anodic oxidation in a short period of time.

The end point of anodic oxidation is generally set to a point at which the current amount is reduced to a given constant value after the anodic oxidation is started with a constant current and then, when the voltage reaches a preset formation voltage (maximum value of anodic oxidation voltage), the anodic oxidation is continued with a constant voltage.

However, if an anode body for which anodic oxidation cannot be carried out normally because of defects of the anode body or the like, for example, an anode body whose current amount is not reduced is incorporated, the anodic oxidation is carried out excessively. To avoid this, in carrying out the above-mentioned constant voltage anodic oxidation, it is preferred to reduce a limit value of the current within a range in which the formation voltage can be maintained, during the forming of the dielectric layer.

Such anodic oxidation can be carried out, for example, by using the jig for manufacturing a capacitor element to be described layer.

In particular, when the number of anode bodies to be processed at the same time is large (e.g., 300 or more), the probability of a defective anode body being mixed is high, and hence the above-mentioned method can be used preferably.

By forming the dielectric layer in this way, the dielectric layer becomes homogeneous in the anode bodies for which the anodic oxidation has been carried out normally, and capacitor elements having a small deviation in capacitance can be obtained.

[Forming of Semiconductor Layer]

Generally, a semiconductor layer, which is the other electrode of a solid electrolytic capacitor, can be constituted by an inorganic semiconductor such as manganese dioxide or an organic semiconductor such as a conductive polymer doped with a dopant. In the present invention, in order to obtain in particular a low equivalent series resistance (ESR), a conductive polymer layer is formed by carrying out polymerization on the anode bodies having the dielectric layer, and the conductive polymer layer is used as a semiconductor layer.

The above-mentioned polymerization can be carried out by a chemical polymerization method, an electropolymerization method using external electrodes, an electropolymerization method using a method involving energizing anode bodies, or a combination thereof. Among these, in the electropolymerization, by carrying out the electropolymerization by limiting energizing currents for individual anode bodies having the dielectric layer formed thereon, a stable conductive polymer layer with good reproducibility can be formed.

In particular, in the electropolymerization using the method involving energizing anode bodies, the jig for manufacturing a capacitor used for forming the dielectric layer can be used as a jig for energizing the anode bodies without change.

When electropolymerization is carried out, it is preferred to carry out polymerization with a low current at an initial stage of electropolymerization and thereafter carry out polymerization with an increased current amount. The current amount may be increased in stages or continuously.

The above-mentioned current amount varies depending on the type of anode body and the material used as the semiconductor layer. As a measure for setting the current amount, for example, such a current amount may be set that pores of the anode bodies are not closed while leaving the semiconductor layer unformed on the surfaces of pores at the initial stage of electropolymerization, that is, a current amount in a range in which the capacitance appearance ratio is not reduced. Further, as to the current amount to be increased, the current amount may be increased to such an extent that the semiconductor layer does not show abnormal growth on the outer surfaces of the anode bodies, that is, to a current amount satisfying allowable dimension accuracy of the outer surfaces.

By carrying out the electropolymerization in the above-mentioned range, a low ESR capacitor element having a high capacitance appearance ratio can be obtained.

[Jig]

The jig for manufacturing a capacitor according to the present invention includes: a plurality of (the numbers corresponding to anode bodies to be processed) power supply circuits provided on an insulating substrate, which are capable of setting each of a voltage limit value and a current limit value; connection terminals for the anode bodies (hereinafter, may be referred to as anode body connection terminals), which are electrically connected to respective outputs of the plurality of power supply circuits; and a terminal for setting the voltage limit value (hereinafter, may be referred to as voltage limiting terminal) and a terminal for setting the current limit value (hereinafter, may be referred to as current limiting terminal) with respect to the plurality of power supply circuits.

Hereinafter, an example of the jig for manufacturing a capacitor according to the present invention is described with reference to FIG. 1, but the present invention is not limited to the example.

Figure 1:
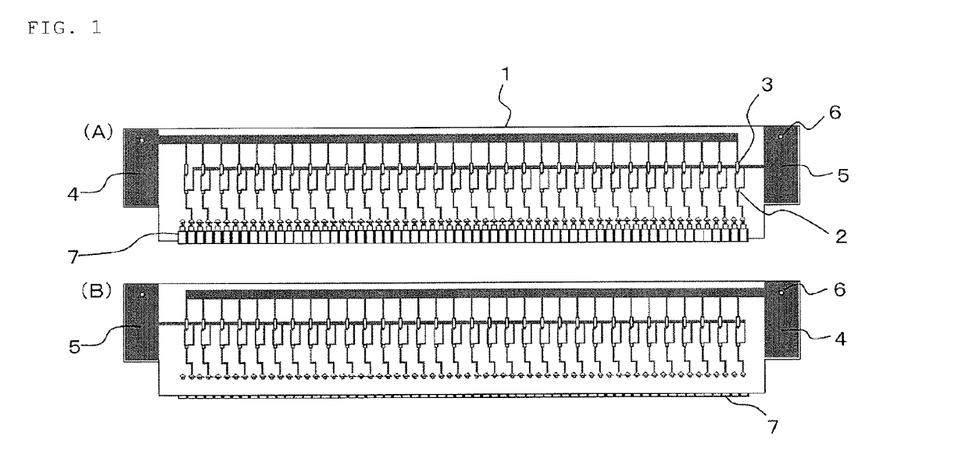
FIG. 1 are a front view (A) and a back view (B) of an example of a jig for manufacturing a capacitor element according to the present invention.

FIG. 1 are a front view (A) and a back view (B) of the example of the jig for manufacturing a capacitor. In a jig (1) for manufacturing a capacitor, 64 pairs (32 pairs each on front and back side) of power supply circuits each formed of a transistor (2) and a resistor (3) are disposed on both sides of a horizontally-long insulating substrate. The jig further includes terminals at both ends thereof, one of which is a current limiting terminal (4) while the other is a voltage limiting terminal (5). The front and back current limiting terminals (4) and the front and back voltage limiting terminals (5) are electrically connected to each other, respectively, via through-holes (6).

In FIG. 1, reference numeral 7 represents anode body connection terminals for connecting lead wires of the anode bodies having the lead wires. The shape of the anode body connection terminals can be changed as appropriate depending on the shape of the anode bodies.

Figure 2:
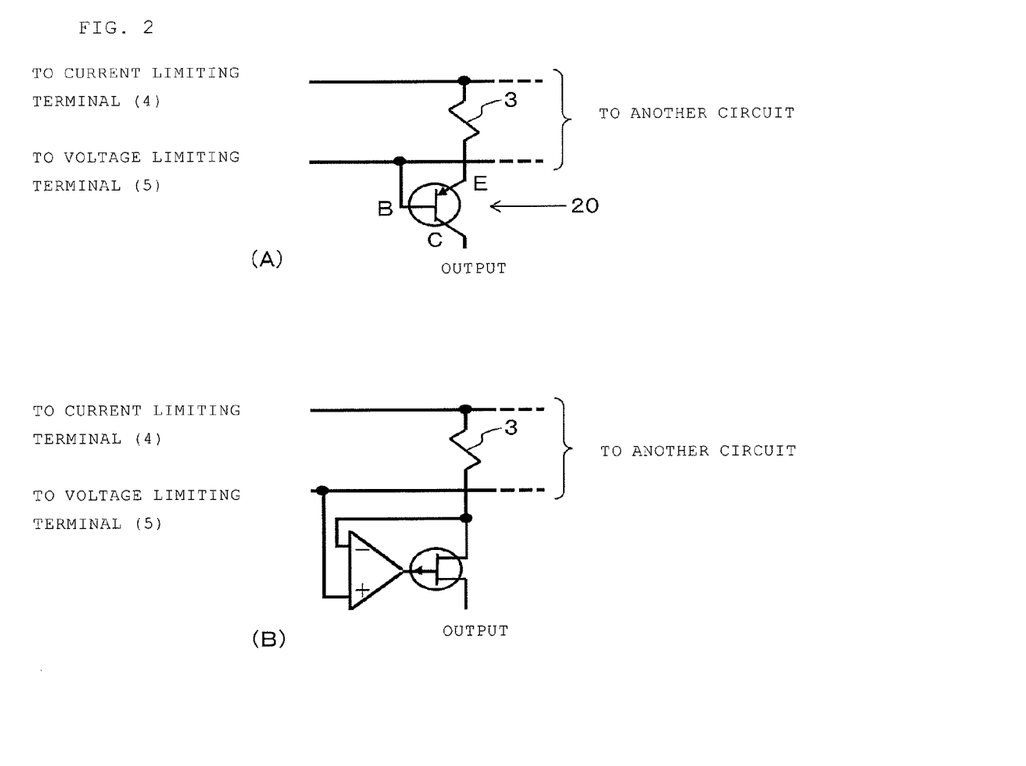
FIGS. 2(A) and 2(B) are each an example of a power supply circuit included in the jig for manufacturing a capacitor element according to the present invention.

FIG. 2 illustrate examples of the individual power supply circuits used in the jig for manufacturing a capacitor of FIG. 1. FIG. 2(A) illustrates a circuit including a PNP transistor (20), in which an emitter (E) of the transistor is electrically connected to the current limiting terminal (4) via the resistor (3), a base (B) of the transistor is electrically connected to the voltage limiting terminal (5), and a collector (C) of the transistor serves as an output.

Figure 3:
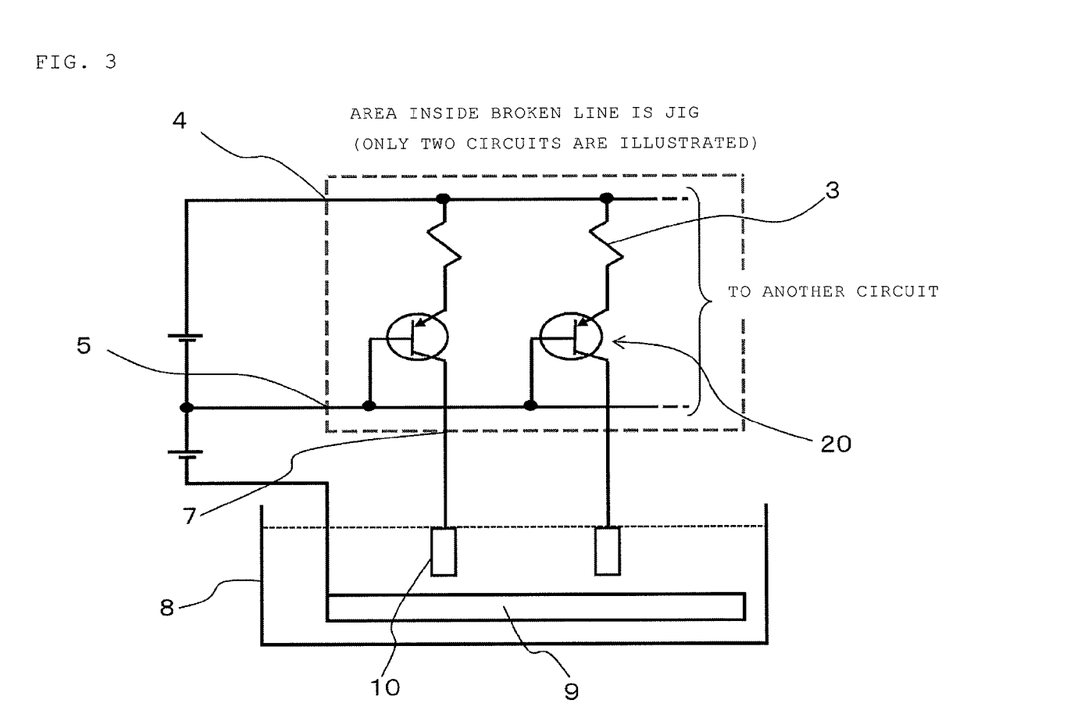
FIG. 3 is a connection example between the power supply circuits of FIG. 2(A) and the jig for manufacturing a capacitor element according to the present invention.

The power supply circuits of FIG. 2(A) and the jig for manufacturing a capacitor of FIG. 1 are connected as illustrated in FIG. 3.

Based on a voltage to be applied between the voltage limiting terminal (5) and a cathode plate (9) in a chemical conversion bath or a polymerization bath (8), a limit value of a maximum voltage to be applied to the anode bodies (10) can be set. The voltage applied between the voltage limiting terminal (5) and the cathode plate (9) in the chemical conversion bath or the polymerization bath (8) substantially equals to the maximum voltage applied to the anode bodies (10).

Further, based on a voltage to be applied between the current limiting terminal (4) and the voltage limiting terminal (5), a limit value of a maximum current which can be supplied to the anode bodies (10) can be set.

The limit value of the maximum current is substantially expressed by the following expression based on the voltage applied between the current limiting terminal (4) and the voltage limiting terminal (5), a base-emitter voltage (Vbe) of the transistor, and a resistance of the resistor.

$$\text{limit value of maximum current}=(\text{voltage applied between current limiting terminal and voltage limiting terminal}-Vbe)/\text{resistance of resistor} \quad [\text{Math. 1}]$$

Generally, Vbe (base-emitter voltage of transistor) is approximately 0.5 to 0.8 V.

The circuit to be used in the jig for manufacturing a capacitor according to the present invention is not limited to the one illustrated in FIG. 2(A). For example, a circuit having a similar function to that of the circuit illustrated in FIG. 2(B) can be used, in which the limit value of the maximum current is proportional to the voltage applied between the current limiting terminal and the voltage limiting terminal.

By changing the voltage applied to the voltage limiting terminal or the current limiting terminal as described above, the voltage limit value or the current limit value can be changed even during the forming of the dielectric layer or during the forming of the semiconductor layer. Further, by changing the voltage applied to the voltage limiting terminal or the current limiting terminal continuously, the voltage limit value or the current limit value can be changed continuously.

In order to obtain a homogeneous dielectric layer having a small capacitance deviation by using the jig for manufacturing a capacitor according to the present invention, under a state in which output currents of all the power supply circuits are limited, when an average value of the output currents of the power supply circuits is 0.4 to 2 mA, the output currents of the individual circuits are set preferably within a range of from 90% at minimum to 110% at maximum of the average value, more preferably within a range of from 95% at minimum to 105% at maximum of the average value.

In order to obtain a homogeneous semiconductor layer having a small capacitance and ESR deviation by using the jig for manufacturing a capacitor according to the present invention, it is preferred to reduce the current deviation in a lower current region similarly to the above. In other words, under the state in which the output currents of all the power supply circuits are limited, when the average value of the output currents of the power supply circuits is 20 to 200 μA, the output currents of the individual circuits are set preferably within a range of from 90% at minimum to 110% at maximum of the average value, more preferably within a range of from 95% at minimum to 105% at maximum of the average value.

In the cases of the circuits of FIGS. 2(A) and 2(B), the above-mentioned current amount deviation can be suppressed by using a resistor with a small error (e.g., with error of 1%).

In the case of manufacturing a capacitor in this way, the capacitances of the individual capacitor elements of a capacitor element group composed of 300 or more capacitor elements manufactured at the same time can be kept within the range of from 90 to 110% of an average value of the capacitances of the 300 or more capacitor elements.

Further, also in an electrolytic capacitor group including electrolytic capacitors constituted by one or a plurality of capacitor elements of the above-mentioned capacitor element group, capacitors having good accuracy and no capacitance fluctuation can be obtained similarly to the above.

In the jig for manufacturing an electrolytic capacitor element according to the present invention, as the width (length in longitudinal direction of FIG. 1) of the insulating substrate is longer, a larger number of elements can be processed by a single jig.

On the other hand, in order to maintain high dimension accuracy of the jig, the width of the insulating substrate is desired to be shorter. In particular, if the jig has a small warp (distortion in front to rear direction of sheet of FIG. 1), in the case where a plurality of jigs are placed side by side in a chemical conversion bath or a polymerization bath having a certain size, even when the jigs are placed closer to one another, constant intervals between the anode bodies can be maintained so that a larger number of anode bodies can be processed at a time.

In the case where a glass epoxy substrate, which is easily available, is used as the material of the jig, the width is preferably 10 to 50 cm, more preferably 20 to 40 cm.

Further, the distance between adjacent anode body connection terminals only needs to be larger than the width of the anode body to be connected. However, it is preferred to increase the interval to such an extent that no liquid bridge is formed when the anode bodies are pulled up out of the process liquid because the step of removing the liquid bridge can be omitted. The width of the anode body is generally about 1 mm to about 10 mm, and hence it is preferred to set the distance between the anode body connection terminals to 1.25 to 12 mm.

Considering the jig width, the anode body width, and the distance between the anode body connection terminals described above, it is preferred to set the number of the power supply circuits per jig for manufacturing an electrolytic capacitor element according to the present invention to 10 to 330.

When the number of the power supply circuits is large or when the anodic oxidation is started with a high current, heat is liable to be generated by the parts used in the power supply circuits. If the insulating substrate is non-uniformly heated by the generated heat, distortion may occur in the insulating substrate due to a partial difference in thermal expansion. In particular, warp is liable to occur due to the difference in temperature of the front and back side of the substrate.

In light of the above, in the case where the warp of the insulating substrate is to be prevented to obtain high dimension accuracy, it is preferred to dispose heating parts so as to reduce the difference in temperature of the front and back side of the substrate. To achieve this, for example, the heating parts may be disposed on both of the front and back sides of the insulating substrate such that the same type of the heating part as the heating part disposed on the front side of the insulating substrate is disposed on a back side thereof corresponding to a position of the heating part disposed on the front side thereof.

Generally, the heating part is a part which may possibly consume the most (50% or higher) of electric power consumed by the power supply circuit. The heating parts in the circuit of FIG. 2(A) are the transistor and the resistor.

Further, it is preferred that the heating parts be disposed on the substrate in a dispersed manner as much as possible in order that only a part of the jig for manufacturing an electrolytic capacitor element be not at high temperature. In order to dispose the heating parts in a dispersed manner, it is preferred to use a discrete circuit as the power supply circuit.

[Capacitor Element and Capacitor]

The resultant obtained by the above-mentioned method, in which the dielectric layer and the semiconductor layer are sequentially formed on the anode bodies, may be completed as a capacitor element without any further process. However, preferably, an electrical conductor layer is formed on the semiconductor layer in order to obtain good electrical connection to an external lead-out wire (e.g., lead frame) of the capacitor, and the resultant is completed as a capacitor element. For example, as the electrical conductor layer, a carbon layer and a silver layer are sequentially laminated on the semiconductor layer, to thereby obtain a capacitor element.

An anode of one or a plurality of the capacitor elements is electrically connected to the anode terminal, and the electrical conductor layer is electrically connected to the cathode terminal, followed by jacketing the capacitor elements with a resin, to thereby obtain an electrolytic capacitor.

EXAMPLES

Hereinafter, the present invention is specifically described by way of examples and comparative examples. However, the present invention is not intended to be limited by the following examples.

Example 1

1. Production of Anode Body

A primary niobium powder (with mean grain diameter of 0.28 μm) obtained by pulverization utilizing hydrogen embrittlement of a niobium ingot was granulated to obtain a niobium powder having a mean grain diameter of 133 μm (this niobium powder is fine powder and contains oxygen of 110,000 ppm due to natural oxidation). Next, the niobium powder was left stand in a nitrogen atmosphere at 450° C. and thereafter in argon at 700° C., to thereby obtain a partially nitrided niobium powder (with CV value of 310,000 μF·V/g) having the nitrided amount of 9,000 ppm.

The obtained niobium powder was shaped together with a niobium wire of 0.29 mmϕ, followed by sintering at 1,270° C., to thereby produce a sintered body (anode body) having the dimensions of 2.3×1.7×1.0 mm. Note that, the niobium lead wire is implanted in a face of 1.7×1.0 mm so as to be embedded inside the sintered body by 1.3 mm and be extended out of the outer surface by 10 mm.

2. Jig for Manufacturing Electrolytic Capacitor Elements

The jig (1) for manufacturing an electrolytic capacitor element illustrated in FIG. 1 was used. The jig is a copper-clad glass epoxy substrate having the dimensions of 194.0×33.0 mm and the thickness of 1.6 mm, in which notch portions of 8×10 mm each are provided in both sides in its longitudinal direction, and two terminal portions serving as electrodes are provided at 8×23 mm portions above the notches (one is the current limiting terminal (4) and the other is the voltage limiting terminal (5)). The terminal portions at the two right and left positions are electrically connected to terminal portions having the same areas provided on the back surface via the through-holes (6) provided at the terminal portions, respectively.

There are mounted 32 pairs each in front and back side of the substrate, in total 64 pairs, of the resistors (3) of 20 kΩ (within error of 1%) and the transistors 2SA2154GR (2), and a single PCD receptacle 399-series round pin DIP gang socket with 64 pins at a pitch of 2.54 mm manufactured by PRECI-DIP (anode body connection terminals (7)) on one surface (front surface). In the gang socket, 64 lead wires are bent at about 90 degrees in the same direction at specified positions and inserted into 64 through-holes formed in the lower portion of the substrate, and are adhered to the substrate mechanically by solder.

One resistor and the emitter of one transistor are connected to each other, and the collector of the one transistor is wired to one socket of the anode body connection terminal. The other side of the resistor is connected to the current limiting terminal. The bases of all the transistors, on the other hand, are connected to the voltage limiting terminal.

3. Production of Capacitor Element

The lead wires of the 64 sintered bodies (in order to prevent the solution from crawlling up during the semiconductor layer formation to be described later, tetrafluoroethylene washer having an inner diameter of 0.24 mm, an outer diameter of 0.80 mm, and a thickness of 0.10 mm is inserted to each of the lead wires at the position 0.15 mm away from the sintered body.) were inserted into the anode body connection terminals, and the sintered bodies were aligned in height and direction. Ten such jigs were prepared and inserted into jig slots of a separately prepared handling frame (hereinafter, may be abbreviated as HF).

Note that, the handling frame (HF) is a frame which has sockets for inserting the right and left terminal portions (current limiting terminal (4) and voltage limiting terminal (5)) of the jig, and is designed to set up ten jigs at 8-mm pitches vertically and in parallel to one another when the terminal portions are inserted.

Using the HF, 640 sintered bodies were arranged at equal intervals in the same direction. Next, the HF was placed at a predetermined height in a separately prepared container made of metal (SUS304) (serving also as the cathode plate of FIG. 3) filled with a 1% phosphoric aqueous solution, so as to establish the connection illustrated in FIG. 3. Then, 8.3 V was applied between the voltage limiting terminal (5) and a metallic container (cathode plate) (9), and then a voltage was applied between the current limiting terminal (4) and the voltage limiting terminal (5) so that a current limit value was 2.1 mA.

Anodic oxidation was carried out at the solution temperature of 65° C. for 8 hours to form a dielectric layer in the pores and the surface of the sintered bodies and at predetermined portions of the lead wires. During the anodic oxidation, the current limit value was reduced continuously at a rate of 0.5 mA per hour after the lapse of 4 hours to 8 hours.

After rinsing and drying, the sintered bodies were immersed into a 20% by mass ethylenedioxythiophene ethanol solution, and thereafter the HF was placed at a predetermined height in a separately prepared SUS303 container containing a solvent made of 30 parts by mass of water and 70 parts by mass of ethylene glycol, in which 0.4% by mass of ethylenedioxythiophene and 0.6% by mass of anthraquinone sulfonic acid were supplied, followed by carrying out electropolymerization at 20° C. for 1 hour. During the electropolymerization, the voltage limit value and the current limit value were respectively adjusted to 10 V and 44 µA for the first 15 minutes (0 to 15 minutes), to 10 V and 82 µA for the next 15 minutes (15 to 30 minutes), and to 10 V and 101 µA for the next 30 minutes (30 to 60 minutes). This operation of polymerization was repeated six times to form a semiconductor layer made of a conductive polymer on the dielectric layer at a predetermined site. Subsequently, reformation was carried out to repair the dielectric layer in the sintered body. The reformation was carried out at a limited voltage of 6.3 V and a limited current of 0.1 mA for 15 minutes by using the same solution that was used for the above-mentioned anodic oxidation. In addition, a carbon paste and a silver paste were sequentially laminated on the semiconductor layer to provide an electrical conductor layer, to thereby produce a capacitor element. Next, the capacitor element was placed on the lead frame. Then, an anode lead of the capacitor element was connected to the anode terminal of the lead frame, and the electrical conductor layer of the capacitor element was connected to the cathode terminal of the lead frame. Then, transfer sealing and aging were carried out to produce 640 niobium solid electrolytic capacitors each having the dimensions of 3.5×2.8×1.8 mm, a rating of 2.5 V, and a capacitance of 330 µF. The electropolymerization conditions for the formation of the semiconductor layer are shown in Table 1. An average capacitance, the range of upper and lower limit values of the capacitance, and an average ESR value of the 600 capacitors are shown in Table 2.

Example 2

Niobium solid electrolytic capacitors were produced similarly to Example 1 except that the voltage limit value and the current limit value in the second to sixth polymerizations were adjusted to 10 V and 101 µA, respectively. The polymerization conditions for the formation of the semiconductor layer are shown in Table 1. An average capacitance, the range of upper and lower limit values of the capacitance, and an average ESR value of the capacitors are shown in Table 2.

Example 3

Solid electrolytic capacitors were produced similarly to Example 1 except that the voltage limit value and the current limit value in the second to sixth polymerizations were adjusted to 10 V and 82 µA, respectively. The polymerization conditions for the formation of the semiconductor layer are shown in Table 1. An average capacitance, the range of upper and lower limit values of the capacitance, and an average ESR value of the capacitors are shown in Table 2.

Example 4

Solid electrolytic capacitors were produced similarly to Example 1 except that the voltage limit value and the current limit value in the second to sixth polymerizations were adjusted to 10 V and 44 µA, respectively. The polymerization conditions for the formation of the semiconductor layer are shown in Table 1. An average capacitance, the range of upper and lower limit values of the capacitance, and an average ESR value of the capacitors are shown in Table 2.

Example 5

Solid electrolytic capacitor were produced similarly to Example 1 except that the voltage limit value and the current limit value in the first polymerization were respectively adjusted to 10 V and 25 µA for the first 10 minutes, 10 V and 44 µA for from 10 to 20 minutes, 10 V and 63 µA for from 20 to 30 minutes, 10 V and 82 µA for from 30 to 40 minutes, 10 V and 101 µA for from 40 to 50 minutes, and 10 and 121 µA 10 V and 121 µA for 50 to 60 minutes, and that the voltage limit value and the current limit value in the second to sixth polymerizations were respectively adjusted to 10 V and 82 µA. The polymerization conditions for the formation of the semiconductor layer are shown in Table 1. An average capacitance, the range of upper and lower limit values of the capacitance, and an average ESR value of the capacitors are shown in Table 2.

Example 6

Solid electrolytic capacitors were produced similarly to Example 1 except that the voltage limit value and the current limit value in the first polymerization were respectively adjusted to 10 V and 25 µA, the voltage limit value and the current limit value in the second polymerization were respectively adjusted to 10 V and 44 µA, the voltage limit value and the current limit value in the third polymerization were respectively adjusted to 10 V and 63 µA, the voltage limit value and the current limit value in the fourth polymerization were respectively adjusted to 10 V and 82 µA, the voltage limit value and the current limit value in the fifth polymerization were respectively adjusted to 10 V and 101 µA, and the voltage limit value and the current limit value in the sixth polymerization were respectively adjusted to 10 V and 112 µA. The polymerization conditions for the formation of the semiconductor layer are shown in Table 1. An average capacitance, the range of upper and lower limit values of the capacitance, and an average ESR value of the capacitors are shown in Table 2.

Example 7

Solid electrolytic capacitors were produced similarly to Example 1 except that the voltage limit value and the current limit value in the first polymerization were respectively adjusted to 10 V and 25 µA, the voltage limit value and the current limit value in the second polymerization were respectively adjusted to 10 V and 44 µA, the voltage limit value and the current limit value in the third polymerization were respectively adjusted to 10 V and 82 µA, the voltage limit value and the current limit value in the fourth polymerization were respectively adjusted to 10 V and 63 µA, and the voltage limit value and the current limit value in the fifth and sixth polymerizations were respectively adjusted to 10 V and 121 µA. The polymerization conditions for the formation of the semiconductor layer are shown in Table 1. An average capacitance, the range of upper and lower limit values of the capacitance, and an average ESR value of the capacitance are shown in Table 2.

Example 8

Solid electrolytic capacitors were produced similarly to Example 1 except that the voltage limit value and the current limit value in the first polymerization were respectively adjusted to 13 V and 82 µA for the first 30 minutes and 10 V and 101 µA for from 30 to 60 minutes, the voltage limit value and the current limit value in the second polymerization were respectively adjusted to 13 V and 82 µA, and the voltage limit value and the current limit value in the third to sixth polymerizations were respectively adjusted to 13 V and 101 µA. The polymerization conditions for the formation of the semiconductor layer are shown in Table 1. An average capacitance, the range of upper and lower limit values of the capacitance and an average ESR value of 640 niobium solid electrolytic capacitors are shown in Table 2.

Example 9

Solid electrolytic capacitors were produced similarly to Example 1 except that the voltage limit value in the first to sixth polymerizations was adjusted to 10 V, and the current limit value was adjusted to 2.2 µA at the start of polymerization and increased at a rate of 1.98 µA per minute to 121 µA after 60 minutes. The polymerization conditions for the formation of the semiconductor layer are shown in Table 1. An average capacitance, the range of upper and lower limit values of the capacitance, and an average ESR value of the capacitors are shown in Table 2.

TABLE 1

| | First polymerization | | | Second polymerization | | | Third polymerization | | |
|---|---|---|---|---|---|---|---|---|---|
| Examples | Polymerization elapsed time (minutes) | Voltage limit value (V) | Current limit value (µA) | Polymerization elapsed time (minutes) | Voltage limit value (V) | Current limit value (µA) | Polymerization elapsed time (minutes) | Voltage limit value (V) | Current limit value (µA) |
| 1 | 0 to 15 | 10 | 44 | 0 to 15 | 10 | 44 | 0 to 15 | 10 | 44 |
| | 15 to 30 | 10 | 82 | 15 to 30 | 10 | 82 | 15 to 30 | 10 | 82 |
| | 30 to 60 | 10 | 101 | 30 to 60 | 10 | 101 | 30 to 60 | 10 | 101 |
| 2 | 0 to 15 | 10 | 44 | 0 to 60 | 10 | 101 | 0 to 60 | 10 | 101 |
| | 15 to 30 | 10 | 82 | | | | | | |
| | 30 to 60 | 10 | 101 | | | | | | |
| 3 | 0 to 15 | 10 | 44 | 0 to 60 | 10 | 82 | 0 to 60 | 10 | 82 |
| | 15 to 30 | 10 | 82 | | | | | | |
| | 30 to 60 | 10 | 101 | | | | | | |
| 4 | 0 to 15 | 10 | 44 | 0 to 60 | 10 | 44 | 0 to 60 | 10 | 44 |
| | 15 to 30 | 10 | 82 | | | | | | |
| | 30 to 60 | 10 | 101 | | | | | | |
| 5 | 0 to 10 | 10 | 25 | 0 to 60 | 10 | 82 | 0 to 60 | 10 | 82 |
| | 10 to 20 | 10 | 44 | | | | | | |
| | 20 to 30 | 10 | 63 | | | | | | |
| | 30 to 40 | 10 | 82 | | | | | | |
| | 40 to 50 | 10 | 101 | | | | | | |
| | 50 to 60 | 10 | 121 | | | | | | |
| 6 | 0 to 60 | 10 | 25 | 0 to 60 | 10 | 44 | 0 to 60 | 10 | 63 |

TABLE 1-continued

| | Fourth polymerization | | | Fifth polymerization | | | Sixth polymerization | | |
|---|---|---|---|---|---|---|---|---|---|
| Examples | Polymerization elapsed time (minutes) | Voltage limit value (V) | Current limit value (µA) | Polymerization elapsed time (minutes) | Voltage limit value (V) | Current limit value (µA) | Polymerization elapsed time (minutes) | Voltage limit value (V) | Current limit value (µA) |
| 7 | 0 to 60 | 10 | 25 | 0 to 60 | 10 | 44 | 0 to 60 | 10 | 82 |
| 8 | 0 to 30 | 13 | 82 | 0 to 60 | 13 | 82 | 0 to 60 | 13 | 121 |
|   | 30 to 60 | 10 | 101 | | | | | | |
| 9 | 0 to 60 | 10 | *1 | 0 to 60 | 10 | *1 | 0 to 60 | 10 | *1 |
| 1 | 0 to 15 | 10 | 44 | 0 to 15 | 10 | 44 | 0 to 15 | 10 | 44 |
|   | 15 to 30 | 10 | 82 | 15 to 30 | 10 | 82 | 15 to 30 | 10 | 82 |
|   | 30 to 60 | 10 | 101 | 30 to 60 | 10 | 101 | 30 to 60 | 10 | 101 |
| 2 | 0 to 60 | 10 | 101 | 0 to 60 | 10 | 101 | 0 to 60 | 10 | 101 |
| 3 | 0 to 60 | 10 | 82 | 0 to 60 | 10 | 82 | 0 to 60 | 10 | 82 |
| 4 | 0 to 60 | 10 | 44 | 0 to 60 | 10 | 44 | 0 to 60 | 10 | 44 |
| 5 | 0 to 60 | 10 | 82 | 0 to 60 | 10 | 82 | 0 to 60 | 10 | 63 |
| 6 | 0 to 60 | 10 | 82 | 0 to 60 | 10 | 101 | 0 to 60 | 10 | 121 |
| 7 | 0 to 60 | 10 | 63 | 0 to 60 | 10 | 121 | 0 to 60 | 10 | 121 |
| 8 | 0 to 60 | 13 | 121 | 0 to 60 | 13 | 121 | 0 to 60 | 13 | 121 |
| 9 | 0 to 60 | 10 | *1 | 0 to 60 | 10 | *1 | 0 to 60 | 10 | *1 |

*1 The current limit value was set to 2.2 µA at the start of polymerization and increased at a rate of 1.98 µA per minute to 121 µA after 60 minutes.

Comparative Examples 1 and 2

Using the sintered body of Example 1 of the present invention, the dielectric layer and the semiconductor layer were formed thereon under the conditions described in Example 1 of JP 2005-244154 (Patent Document 1), and solid electrolytic capacitors were produced similarly to Example 1 of the present invention. The forming of the dielectric layer requires 10 hours. Note that, the current values of the current regulative diodes (CRDs) in the jig of Patent Document 1 were set to 60 µA on average in Comparative Example 1 and to 120 µA on average in Comparative Example 2. Average capacitances, the range of upper and lower limit values of the capacitance and an average ESR value of the capacitors produced in Comparative Example 1 and Comparative Example 2 are shown in Table 2.

Comparative Example 3

Ten jigs in which the current values of the current regulative diodes (CRDs) were set to 44 µA on average, ten jigs in which the current values thereof were set to 82 µA on average, and ten jigs in which the current values thereof were set to 101 µA on average in Comparative Example 1 were prepared. First, 640 sintered bodies similarly to those of Example 1 of the present invention were mounted onto the ten jigs in which the current values were set to 44 µA on average, and a dielectric layer was formed under the conditions described in Example 1 of Patent Document 1. After that, polymerization was carried out similarly to Example 1 of the present invention. The forming of the dielectric layer required 10 hours. In order to adjust to the current values set for the electropolymerization of Example 1, the sintered bodies were detached from the jigs after 15 minutes. Then, the sintered bodies were remounted to the jigs in which the current values were set to 82 µA on average, and polymerization was carried out for 15 minutes. After that, the sintered bodies were detached from the jigs, and then remounted to the jigs in which the current values were set to 101 µA on average, and polymerization was carried out for 30 minutes (it took about 1 hour to remount the sintered bodies to the respective jigs.). After such polymerization was carried out six times, solid electrolytic capacitors were produced similarly to Example 1. An average capacitance, the range of upper and lower limit values of the capacitance, and an average ESR value of the capacitors are shown in Table 2.

TABLE 2

| | Capacitance (µF) | ESR (mΩ) |
|---|---|---|
| Example 1 | 362 ± 13 | 15 |
| Example 2 | 351 ± 11 | 17 |
| Example 3 | 356 ± 13 | 17 |
| Example 4 | 342 ± 10 | 19 |
| Example 5 | 365 ± 15 | 16 |
| Example 6 | 337 ± 10 | 20 |
| Example 7 | 333 ± 11 | 20 |
| Example 8 | 344 ± 11 | 18 |
| Example 9 | 366 ± 8 | 12 |
| Comparative Example 1 | 303 ± 46 | 21 |
| Comparative Example 2 | 295 ± 51 | 24 |
| Comparative Example 3 | 266 ± 89 | 47 |

* The capacitance and the ESR are the average taken over 600 capacitors (551 capacitors in Comparative Examples) extracted at random from 640 capacitors produced.

As is apparent from Table 2, the capacitors produced by the method of the present invention have an extremely small capacitance deviation, and the capacitances of the capacitors of Examples 1 to 9 are each within 95 to 105% of the average capacitance. This is expected to result from the fact that a capacitance distribution width of the capacitor elements obtained by the method of the present invention is small.

Further, the ESR is also reduced as compared to Comparative Examples 1 and 2 in which the semiconductor layer was formed with a constant current.

In Comparative Example 3, anodic oxidation in which the currents were limited with respect to the individual anode bodies as in Examples was not carried out, but the formation conditions for the semiconductor layer should be close to the conditions of Examples as compared to Comparative Examples 1 and 2. However, the deviation in capacitor capacitance of Comparative Example 3 is larger than those in Comparative Examples 1 and 2. This is expected to result from the fact that, when the mounting and detaching of the sintered bodies onto and from the jig were repeated, a capacitor element which had not been re-mounted with sufficient positional accuracy was mixed into the capacitors of Table 2.

REFERENCE SIGNS LIST 1 jig for manufacturing capacitor
2, 20 transistor
3 resistor
4 current limiting terminal
5 voltage limiting terminal
6 through-hole
7 anode body connection terminal
8 chemical conversion bath or polymerization bath
9 cathode plate
10 anode body
B base of transistor
E emitter of transistor
C collector of transistor

The invention claimed is:

1. A method of manufacturing an electrolytic capacitor element, including the steps of: forming a dielectric layer on surfaces of a plurality of anode bodies by anodic oxidation at one time; and forming a semiconductor layer on the dielectric layer, in which the anodic oxidation is carried out by limiting a current for the anodic oxidation with respect to the individual anode bodies.

2. The method of manufacturing an electrolytic capacitor element according to claim 1, in which a limit value of the current is reduced during the forming of the dielectric layer.

3. The method of manufacturing an electrolytic capacitor element according to claim 1, in which the anodic oxidation to be carried out by limiting the current for the anodic oxidation with respect to the individual anode bodies is carried out by using a jig for manufacturing an electrolytic capacitor element, the jig including: (i) a plurality of power supply circuits provided on an insulating substrate, which are capable of setting each of a voltage limit value and a current limit value; (ii) connection terminals for the plurality of anode bodies, which are electrically connected to respective outputs of the plurality of power supply circuits; and (iii) a terminal for setting the voltage limit value and a terminal for setting the current limit value with respect to the plurality of power supply circuits.

4. The method of manufacturing an electrolytic capacitor element according to claim 1, in which: the forming of the semiconductor layer is formed by electropolymerization; and the electropolymerization is carried out by limiting a current with respect to the individual anode bodies on which the dielectric layer is formed.

5. The method of manufacturing an electrolytic capacitor element according to claim 4, in which the electropolymerization is carried out by a method involving energizing the anode bodies.

6. The method of manufacturing an electrolytic capacitor element according to claim 4, in which a limit value of the current for the electropolymerization is increased during the electropolymerization.

7. The method of manufacturing an electrolytic capacitor element according to claim 4, in which: the electropolymerization to be carried out by limiting the current with respect to the individual anode bodies on which the dielectric layer is formed is carried out by using a jig for manufacturing an electrolytic capacitor element, the jig including: (i) a plurality of power supply circuits, which are capable of setting each of a voltage limit value and a current limit value on an insulating substrate; (ii) connection terminals for the plurality of anode bodies, which are electrically connected to respective outputs of the plurality of power supply circuits; and (iii) a terminal for setting the voltage limit value and a terminal for setting the current limit value with respect to the plurality of power supply circuits; and under a state in which output currents of all the plurality of power supply circuits are limited, when an average value of the output currents of the plurality of power supply circuits is 20 to 200 µA, the output currents of the individual power supply circuits are set within a range of from 90 to 110% of the average value.

8. The method of manufacturing an electrolytic capacitor element according to claim 3, in which the anodic oxidation and the electropolymerization are carried out by using the same jig.

9. The method of manufacturing an electrolytic capacitor element according to claim 1, in which a number of the plurality of anode bodies is equal to or larger than 300.

10. A method of manufacturing an electrolytic capacitor, including: manufacturing an electrolytic capacitor element by the method described in claim 1; electrically connecting an anode body of one or a plurality of the electrolytic capacitor elements to an anode terminal and electrically connecting a semiconductor layer to a cathode terminal; and jacketing the capacitor elements with a resin thereafter.

11. An electrolytic capacitor element group, comprising 300 or more electrolytic capacitor elements which are obtained by the method according to claim 7 and in which the dielectric layer is formed at one time, wherein the individual electrolytic capacitor elements each have a capacitance within a range from 90 to 110% of an average value of capacitances of the plurality of electrolytic capacitor elements.

12. An electrolytic capacitor group, comprising electrolytic capacitors each including one or a plurality of capacitor elements of the electrolytic capacitor element group according to claim 11.

13. A jig for manufacturing an electrolytic capacitor element, for forming a dielectric layer on a surface of an anode body by anodic oxidation, the jig including: (i) a plurality of power supply circuits provided on an insulating substrate, which are capable of setting a voltage limit value and/or a current limit value for forming a semiconductor layer on the dielectric layer formed on the surface of the anode body; (ii) connection terminals for the anode body, which are electrically connected to respective outputs of the plurality of power supply circuits; and (iii) a terminal for setting the voltage limit value and a terminal for setting the current limit value with respect to the plurality of power supply circuits.

14. The jig for manufacturing an electrolytic capacitor element according to claim 13, for forming the dielectric layer on the surface of the anode body by the anodic oxidation, in which, under a state in which output currents of all the plurality of power supply circuits are limited, when an average value of the output currents of the plurality of power supply circuits is 0.4 to 2 mA, the output currents of the individual power supply circuits fall within a range of from 90% at minimum to 110% at maximum of the average value.

15. The jig for manufacturing an electrolytic capacitor element according to claim 13, for forming the semiconductor layer on the dielectric layer formed on the surface of the anode body, in which, under a state in which output currents of all the plurality of power supply circuits are limited, when an average value of the output currents of the plurality of power supply circuits is 20 to 200 µA, the output currents of the individual power supply circuits fall within a range of from 90% at minimum to 110% at maximum of the average value.

16. The jig for manufacturing an electrolytic capacitor element according to claim 13, which are capable of changing the voltage limit value or the current limit value during the forming of the dielectric layer or the forming of the semiconductor layer.

17. The jig for manufacturing an electrolytic capacitor element according to claim 16, in which the power supply circuits are capable of changing continuously the current limit value by a voltage applied to the terminal for setting the current limit value.

18. The jig for manufacturing an electrolytic capacitor element according to claim 13, in which a number of the plurality of power supply circuits is 10 to 330.

19. The jig for manufacturing an electrolytic capacitor element according to claim 13, in which: each of the power supply circuits has heating parts; the heating parts are disposed on both front and back side of the insulating substrate; and the same type of the heating part as the heating part disposed on the front side of the insulating substrate is disposed on a back side thereof corresponding to a position of the heating part disposed on the front side thereof.

20. The jig for manufacturing an electrolytic capacitor element according to claim 19, in which the heating parts are each a transistor or a resistor.

21. The jig for manufacturing an electrolytic capacitor element according to claim 19, in which the power supply circuits are each constituted by a discrete circuit.

22. The jig for manufacturing an electrolytic capacitor element according to claim 13, in which each of the power supply circuits is a circuit including a PNP transistor, in which an emitter of the transistor is electrically connected to a terminal for setting a maximum current value via a resistor, a base of the PNP transistor is electrically connected to a terminal for setting a maximum voltage value, and a collector of the transistor serves as an output.

* * * * *